US00RE45688E

(19) United States
(12) Reissued Patent
Lappalainen et al.

(10) Patent Number: US RE45,688 E
(45) Date of Reissued Patent: Sep. 29, 2015

(54) VACUUM SEWER SYSTEM

(71) Applicant: Evac OY, Espoo (FI)

(72) Inventors: Vesa Lappalainen, Vantaa (FI); Gunnar Lindroos, Helsinki (FI); Kaj Ronnblad, Vantaa (FI)

(73) Assignee: Evac Oy, Espoo (FI)

(21) Appl. No.: 13/832,914

(22) Filed: Mar. 15, 2013

Related U.S. Patent Documents

Reissue of:
(64) Patent No.: 7,770,241
Issued: Aug. 10, 2010
Appl. No.: 11/704,845
Filed: Feb. 9, 2007

(30) Foreign Application Priority Data

Mar. 31, 2006 (FI) ..... 20065209

(51) Int. Cl.
*E03D 11/00* (2006.01)

(52) U.S. Cl.
CPC ..... *E03D 11/00* (2013.01)

(58) Field of Classification Search
CPC ..... E03F 1/006
USPC ..... 4/431, 434, 321
See application file for complete search history.

(56) References Cited

U.S. PATENT DOCUMENTS 5,983,414 A * 11/1999 Lindroos et al. ..... 4/435
6,128,789 A 10/2000 Olav ..... 4/431
7,770,241 B2 8/2010 Lappalainen et al.
2004/0237183 A1* 12/2004 Lindroos ..... 4/431
2006/0213561 A1* 9/2006 Tiwet ..... 137/488
2007/0226887 A1* 10/2007 Lappalainen et al. ..... 4/431

FOREIGN PATENT DOCUMENTS

| | | |
|---|---|---|
| CN | 1518625 | 4/2004 |
| CN | 1518625 A | 8/2004 |
| EP | 0436357 | 7/1991 |
| EP | 436357 | 7/1991 |
| EP | 0778432 | 6/1997 |
| EP | 778432 | 6/1997 |
| WO | WO2003000999 | 1/2003 |
| WO | 2003000999 | 3/2003 |

OTHER PUBLICATIONS

Office Action dated Mar. 4, 2009 in U.S. Appl. No. 11/704,845.
Office Action dated Dec. 8, 2009 in U.S. Appl. No. 11/704,845.
(Continued)

*Primary Examiner* — Lori Baker
(74) *Attorney, Agent, or Firm* — Kilpatrick Townsend & Stockton LLP; Dean W. Russell; Kristin M. Crall

(57) ABSTRACT

Disclosed is a sewer system including a sewage receptacle, sewer piping connected to the sewage receptacle by means of a discharge valve, a mechanism for generating vacuum in the sewer piping, and a control mechanism for controlling the discharge valve. In order to achieve a more rapid closing of the discharge valve after discharge of the sewage from the sewage receptacle, the vacuum sewer system further comprises an aeration device in direct fluid communication with the discharge valve. The control mechanism is arranged to control the aeration device. Also disclosed is a discharge valve (2) for such a vacuum sewer system.

18 Claims, 5 Drawing Sheets

(56) References Cited

OTHER PUBLICATIONS

Office Action dated Sep. 4, 2009 in U.S. Appl. No. 11/704,845.
Notice of Allowance dated Mar. 12, 2010 in U.S. Appl. No. 11/704,845.
English translation of First Office Action dated Apr. 26, 2010 issued by the State Intellectual Property Office, P.R. China in related Application No. 200710091962.2.

* cited by examiner

VACUUM SEWER SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATION

This application claims priority to Finnish Patent Application No. 20065209 filed on Mar. 31, 2006, the contents of which are incorporated herein by reference.

BACKGROUND OF THE INVENTION

The present invention relates to a vacuum sewer system comprising a sewage receptacle, sewer piping connected to the sewage receptacle by means of a discharge valve, a vacuum generating means for generating vacuum in the sewer piping, and a control mechanism for controlling the discharge valve, according to the preamble of claim 1. The present invention also relates to a discharge valve for such a vacuum sewer system according to the preamble of claim 11.

In the context of the present invention the sewage receptacle may be e.g. a toilet unit or toilet bowl, urinal, sink, wash basin, shower, etc. The sewage may be black water originating from e.g. a toilet unit or a urinal, or grey water originating from e.g. a sink, wash basin, shower, etc. A rinse water arrangement may be deployed depending upon the source of sewage.

In vacuum sewer systems, where the function of the sewage receptacle, and particularly the discharge valve, is pneumatically governed, i.e. by air/vacuum, the source of vacuum normally is the sewer piping. Vacuum for the control mechanism is often taken at a point of the sewer piping adjacent the discharge valve in the flow direction of the sewage. When the discharge valve is opened, the vacuum level is lowered due to atmospheric air entering the sewer piping.

The control mechanism functions like a three-way valve, whereby the closing of the discharge valve takes place by aeration of the same by way of the control mechanism. Consequently, the closing speed is dependent on the flow resistance of the aeration conduit.

Previously known vacuum governed discharge valves have a distinctively high noise level as the air-flow through the discharge valve is strongly choked or throttled when the discharge valve is closed.

Examples of previous attempts to lower the noise level may be found in U.S. Pat. No. 6,128,789, in which the discharge valve is closed more rapidly, EP 0 436 357 and EP 0 778 432, in which supplementary air is introduced into the sewer piping. These solutions are rather complex and provide a very limited result.

DETAILED DESCRIPTION OF THE INVENTION

An object of the present invention is to achieve a vacuum sewer system in which the noise level during a discharge or flushing sequence is lowered. A further object of the present invention is to provide a discharge valve, which improves the operation of the vacuum sewer system. These objects are attained by a vacuum sewer system according to claim 1 and a discharge valve according to claim 11.

The basic idea of the invention is to provide the vacuum sewer system with an aeration means, a so-called rapid vent valve that provides for an effective and rapid closing of the discharge valve after discharge of the sewage from the sewage receptacle, which also results in a lower noise level. The effective and rapid closing of the discharge valve is achieved by a direct supply of supplementary air to the discharge valve. To this effect the vacuum sewer system comprises an aeration means, which is arranged to provide a direct fluid communication to the discharge valve. The control mechanism, which controls the discharge valve, is also arranged to control the function of the aeration means. Particularly, the discharge valve is provided with such an aeration means.

The aeration means is arranged to supply air to the discharge valve for rapidly closing the discharge valve after a discharge or flushing sequence. The aeration means is arranged to be closed when the discharge valve is provided with vacuum for opening the same for the discharge or flushing sequence. In this way, the aeration means affects the closure time, but does not interfere with the opening of the discharge valve.

Such an aeration means may advantageously be pneumatically or electrically governed.

The aeration means advantageously comprises a vent valve, which is attached to the discharge valve and connected to the control mechanism by means of a fourth conduit. This arrangement provides for direct and rapid aeration of the discharge valve at its closing phase and may be governed by the control mechanism through the fourth conduit. The aeration means is advantageously provided with an aeration nozzle for closing the aeration means with a given delay after the discharge or flushing sequence.

The aeration means may also comprise a vent valve, which is arranged in connection with the discharge valve and connected to the control mechanism by means of a fourth conduit, whereby a fifth conduit is provided between the aeration means and the discharge valve. This arrangement provides for direct and rapid aeration of the discharge valve at its closing phase. The aeration means may be attached to the discharge valve or arranged separately of the discharge valve. The opening and closing function of the aeration means may be governed by the control mechanism in series with the discharge valve.

The function of the aeration means may advantageously also be electrically governed. To this effect the aeration means comprises a vent valve, which is attached to the discharge valve, whereby the control mechanism is arranged to control the aeration means by way of a sensor device and a magnetic valve connected to the aeration means. This arrangement provides for direct and rapid aeration of the discharge valve at its closing phase. The sensor device is advantageously connected to the control means for reading, if the vacuum connection to the discharge valve is switched on or off, and to correspondingly close or open the aeration means.

The above provides easy and reliable ways to govern the function of the aeration means based on the vacuum control of the discharge valve provided by the control mechanism.

BRIEF DESCRIPTION OF THE DRAWINGS

In the following the present invention is described in more detail, by way of example only, with reference to the attached schematic drawings, in which.

DETAILED DESCRIPTION OF THE DRAWINGS

Figure 1:
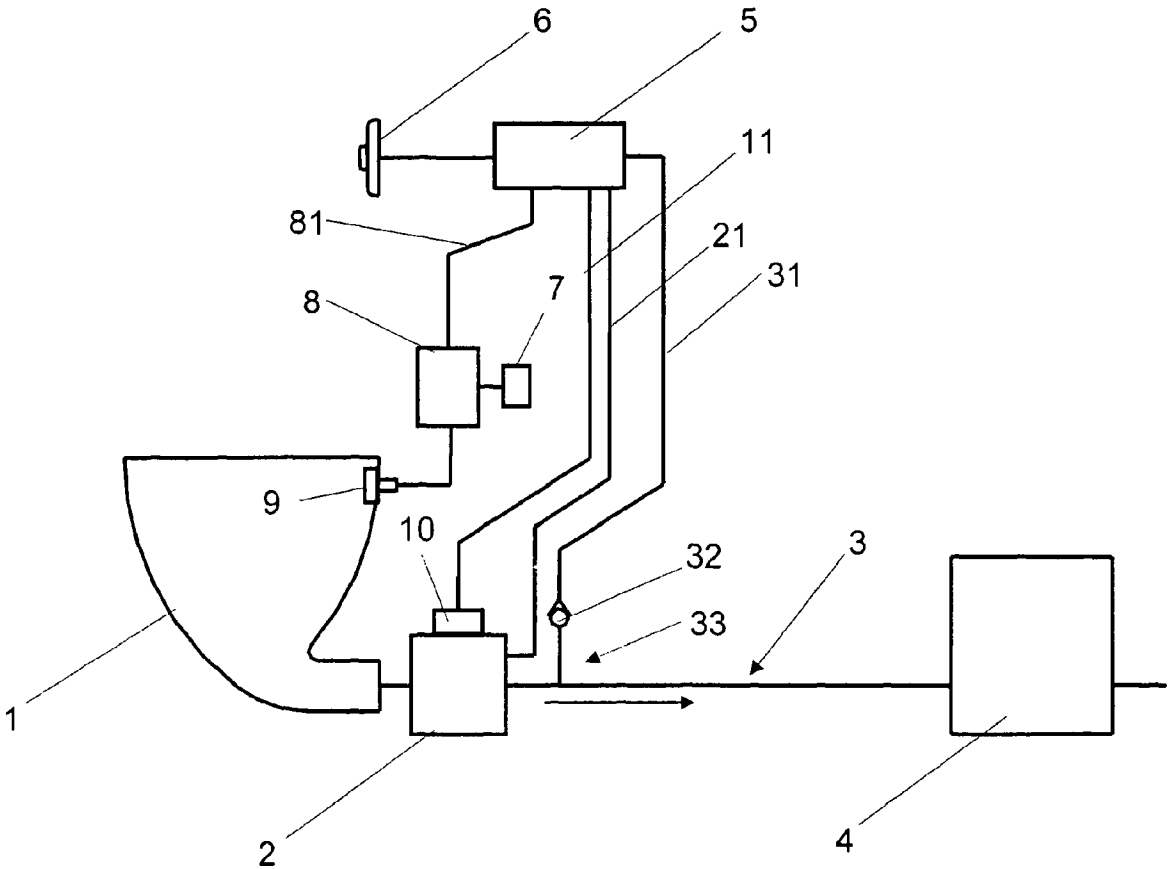
FIG. 1 illustrates a vacuum sewer system deploying the present invention.

FIG. 1 illustrates in a general manner an embodiment of a vacuum sewer system comprising a sewage receptacle 1, sewer piping 3 connected to the sewage receptacle 1 by means of a discharge valve 2, and a vacuum generating means 4 for generating vacuum in the sewer piping 3. The vacuum sewer system is provided with a control mechanism 5 for controlling the function of the discharge valve 2. The vacuum sewer system may include a plurality of sewage receptacles with related discharge valves, (water valves), and control mechanisms, whereby the number of vacuum generating means may vary depending upon the layout and size of the whole system.

Vacuum sewer systems, including vacuum operated discharge valves, vacuum operated water valves, and vacuum control mechanisms, are well known in the art and are not therefore explained in further detail in this connection.

The vacuum control mechanism 5 is connected to the sewer piping 3, at a point 33 adjacent the discharge valve 2 in the flow direction (indicated by an arrow) of the sewage, by means of a first conduit 31 and through a check valve 32. The control mechanism 5 is connected to the vacuum operated discharge valve 2 by means of a second conduit 21. The control mechanism 5 is also provided with an activating means 6, such as a push button or an infrared trigger device, for activating the control mechanism 5 in order to initiate a flushing or discharge sequence.

In this embodiment the sewage receptacle 1 is shown as a toilet bowl also provided with a rinse water arrangement comprising a water supply 7, a vacuum operated water valve 8 and a rinse water nozzle 9 in connection with the toilet bowl. The control mechanism 5 also governs the function of the water valve 8 and is connected thereto by means of a third conduit 81.

The sewage receptacle may also be a urinal, sink, washbasin, shower, etc. as discussed above. The rinse water arrangement is optional and its use is dependent of the type of sewage receptacle.

FIG. 1 also shows in a general manner that the vacuum sewer system is provided with an aeration means 10, in this embodiment in the form of a rapid vent valve, which is in fluid communication with the discharge valve 2 and the control mechanism 5 (by means of a fourth conduit 11). The purpose of the aeration means 10 is to accelerate or speed up the closing of the discharge valve 2, whereby its function is controlled by the control mechanism 5. This will be discussed in more detail in connections with FIGS. 3, 4 and 5 below.

Basically each sewage receptacle is provided with a discharge valve, to which the aeration means is connected. As a vacuum sewer system usually comprises one or more, or even a plurality of sewage receptacles, the number of discharge valves and thereto connected aeration means in a system vary accordingly. The discharge valves including the aeration means may separately be installed or replaced in connection with service, repair, or e.g. enlarging the vacuum sewer system.

Figure 2:
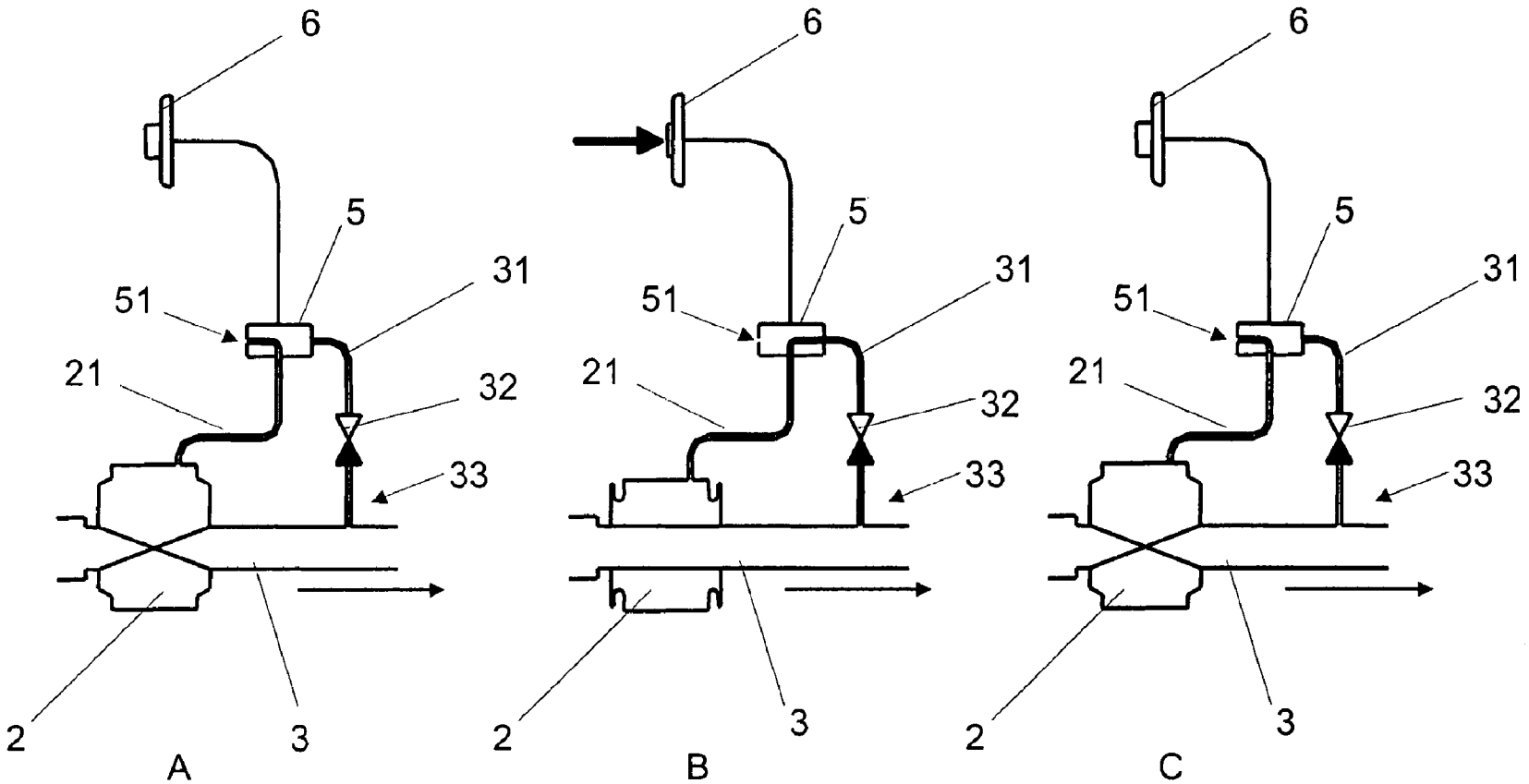
FIG. 2 illustrates a discharge or flushing sequence.

FIG. 2 illustrates the discharge or flushing sequence usually employed in connection with vacuum sewer systems as discussed above. The function of the vacuum sewer system is usually based on vacuum present in the sewer piping 3. The control unit 5 directs or supplies vacuum to the discharge valve 2 (and the water valve 8, FIG. 1) for opening the same. The control mechanism 5 generally functions like a three-way valve, whereby also aeration of the discharge valve 2 takes place through the control mechanism 5 by a switch of the three-way valve position.

In a stand-by mode (A) vacuum is connected to the control mechanism 5 for governing the function of the discharge valve 2. Vacuum is tapped at point 33 of the sewer piping 3, adjacent and downstream of the discharge valve 2, and led through the check valve 32 and the first conduit 31 to the control mechanism 5. The discharge valve 2 is aerated through the second conduit 21 and an aeration valve 51 in the control mechanism 5.

For the discharge or flushing sequence (B), the control mechanism 5 is activated (indicated by a black arrow) by the activating means 6. This switches the three-way valve position and establishes a contact between the second conduit 21 and the vacuum available in the control mechanism 5 through the first conduit 31. Vacuum is thus connected to the discharge valve for opening the same, whereby sewage collected in the sewage receptacle 1 (FIG. 1) is discharged (direction of sewage flow indicated by arrow) as the discharge valve 2 is opened.

After a given time, the control mechanism 5 closes said contact, by switching the three-way valve position, and re-establishes contact between the second conduit 21 and the aeration valve 51 (corresponding to the stand-by mode A), whereby the discharge valve 2 is aerated and consequently closed (aeration mode C).

The vacuum sewer system is then ready for a new discharge or flushing sequence.

Figure 3:
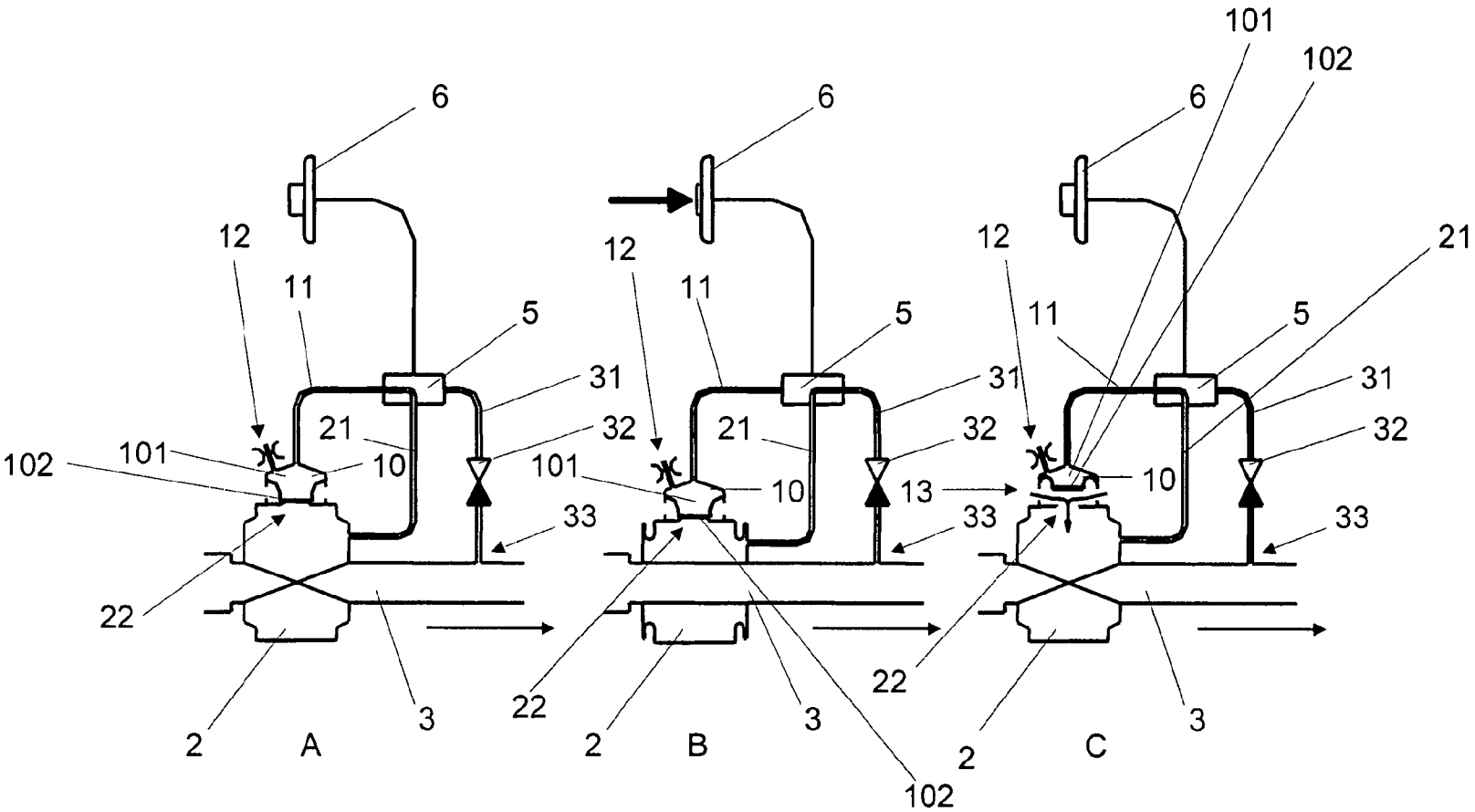
FIG. 3 illustrates a first embodiment of a discharge or flushing sequence deploying the present invention.

FIG. 3 shows a first embodiment of the present invention. The function of the vacuum sewer system is based on vacuum present in the sewer piping 3. The control mechanism 5 directs or supplies vacuum to the discharge valve 2 for opening the same. The control mechanism 5 generally functions like a three-way valve.

In this embodiment the vacuum sewer system comprises an aeration means 10, which is directly attached to the discharge valve 2 and connected to the control mechanism 5 by means of a fourth conduit 11. The aeration means 10 is in the form of a vent valve, or rapid vent valve and its purpose is to rapidly ventilate, i.e. provide air directly to the vacuum operated discharge valve 2 for the closing of the same. The aeration means 10 comprises an expandable chamber 101 with a valve plate 102 arranged to open or close against a valve seat 22 in the discharge valve 2. In addition the aeration means 10 is provided with an aeration nozzle 12. The aeration means is pneumatically governed, by air/vacuum.

In a stand-by mode (A) vacuum is connected to the control mechanism 5. Vacuum is tapped at point 33, adjacent and downstream of the discharge valve 2, of the sewer piping 3 and led through the check valve 32 and the first conduit 31 to the control mechanism 5. The discharge valve 2 is aerated through the aeration nozzle 12 of the aeration means 10 through the fourth conduit 11 connecting by way of the control mechanism 5 to the second conduit 21 leading to the discharge valve 2. The aeration means 10 is closed, being aerated through the aeration nozzle 12, with respect to the discharge valve 2 in this stand-by mode A. This is illustrated by the valve plate 102 being closed against the valve seat 22 in the discharge valve 2.

For the discharge or flushing sequence (B), the control mechanism 5 is activated (indicated by a black arrow) by the activating means 6. This switches the three-way valve position and establishes a contact between the second conduit 21 and the vacuum available in the control mechanism 5 through the first conduit 31. Vacuum is thus connected to the discharge valve 2 for opening the same, whereby sewage collected in the sewage receptacle 1 (FIG. 1) is discharged (direction of sewage flow indicated by arrow) as the discharge valve 2 is opened. The control mechanism 5 closes the connection to the fourth conduit 11 and the aeration means 10 remains closed and aerated through the aeration nozzle 12.

After a given time, the control mechanism 5 closes the vacuum connection by switching the three-way valve position and re-establishes contact between the second conduit 21 and the fourth conduit 11 connected to the aeration means 10. This switching connects the vacuum in the discharge valve 2 by way of the second conduit 21 through the control means 5 and further through the fourth conduit 11 to the aeration means 10, whereby the aeration means 10 is opened. The vacuum contracts the expandable chamber 101 of the aeration means 10, whereby the valve plate 102 is withdrawn from the valve seat 22 in the discharge valve 2.

As a consequence, the discharge valve 2 receives air (indicated by a double-ended arrow) directly through first openings 13 and the open valve seat 22 and is rapidly closed (aeration mode C). The aeration means 10 is aerated through the aeration nozzle 12 and closes with a given delay (depending on the dimensioning of the aeration nozzle 12).

The aeration means 10 according to the invention provides a rapid closure of the discharge valve 2 with the advantages discussed above.

The vacuum sewer system is then ready for a new discharge or flushing sequence.

Rapid aeration of the discharge valve may be provided in many ways. An alternative arrangement will be discussed in connection with FIG. 4 as follows.

Figure 4:
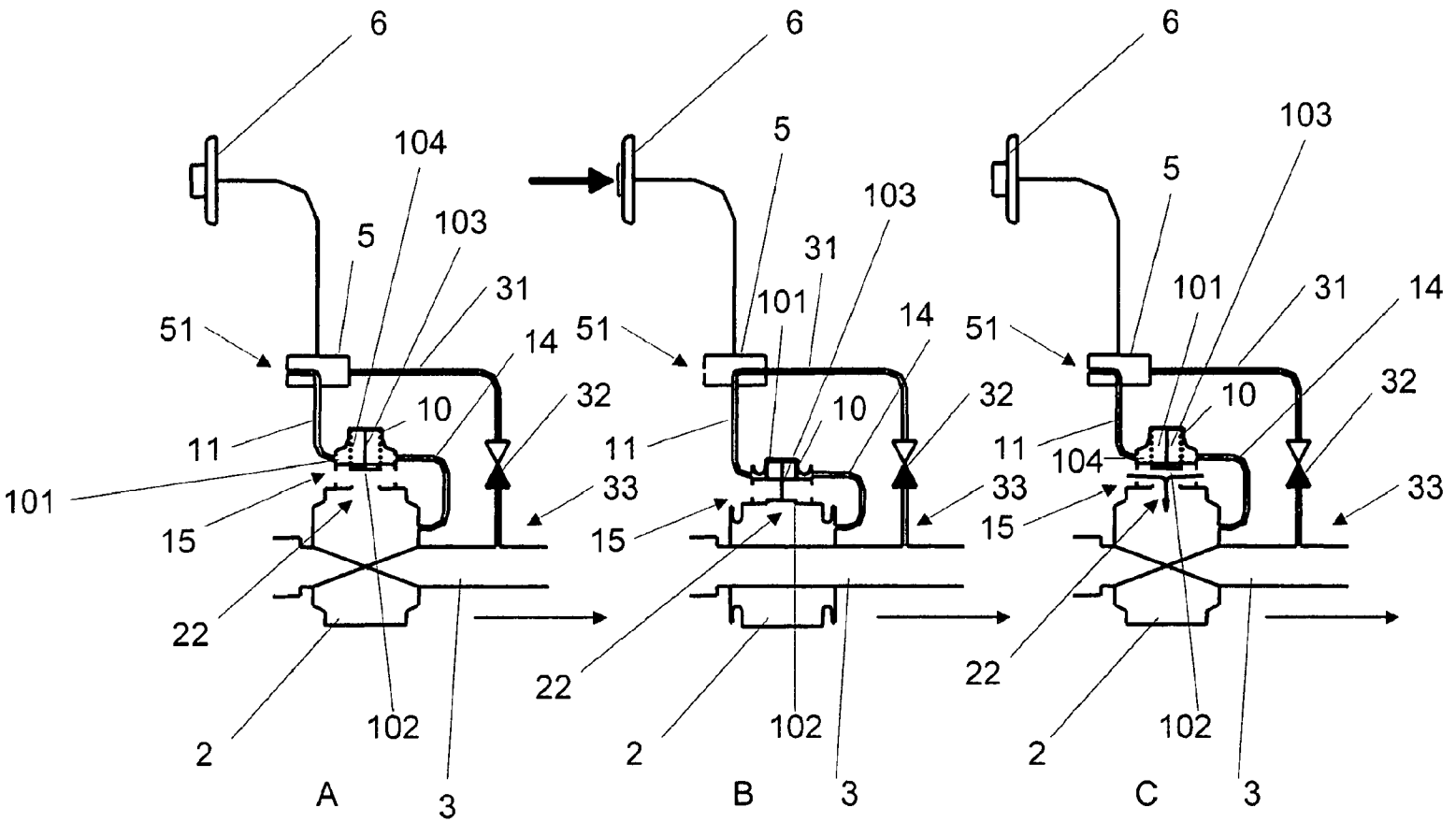
FIG. 4 illustrates a second embodiment of a discharge or flushing sequence deploying the present invention.

FIG. 4 shows a second embodiment of the present invention. The function of the vacuum sewer system is based on vacuum present in the sewer piping 3. The control mechanism 5 directs or supplies vacuum to the discharge valve 2 for opening the same. The control mechanism 5 generally functions like a three-way valve.

In this embodiment the vacuum sewer system comprises an aeration means 10, which is in connection with the discharge valve 2 and connected to the control means 5 by means of a fourth conduit 11. The aeration means 10 is in the form of a vent valve, or rapid vent valve and its purpose is to rapidly ventilate, i.e. provide air directly to the vacuum operated discharge valve 2 for the closing of the same. The aeration means 10 comprises an expandable chamber 101 with an internal spring means 104 and a valve stem 103 with a valve plate 102, which is arranged to open or close against a valve seat 22 in the discharge valve 2. The aeration means is pneumatically governed, by air/vacuum.

The vacuum connection from the control mechanism 5 to the discharge valve 2 passes through the aeration means 10, whereby the fourth conduit 11 provides the connection between the control mechanism 5 and the aeration means 2 and a fifth conduit 14 provides a connection between the aeration means 10 and the discharge valve 2.

In a stand-by mode (A) vacuum is connected to the control mechanism 5. Vacuum is tapped at point 33, adjacent and downstream of the discharge valve 2, of the sewer piping 3 and led through the check valve 32 and the first conduit 31 to the control mechanism 5. The discharge valve 2 is aerated through second openings 15. The aeration means 10 is aerated through the aeration valve 51 by way of the fourth conduit 11 and through the discharge valve 2 by way of the fifth conduit 14. This keeps the expandable chamber 101 of the aeration means 10 in an expanded state, biased by the internal spring means 104, which keeps the valve stem 103 with the valve plate 102 withdrawn from the valve seat 22 in the discharge valve 2 allowing for an inflow of air through the second openings 15 as discussed above.

For the discharge or flushing sequence (B), the control mechanism 5 is activated (indicated by a black arrow) by the activating means 6. This switches the three-way valve position and establishes a contact between the fourth conduit 11 and the vacuum available in the control mechanism 5 through the first conduit 31. Vacuum is thus connected to the aeration means 10 through the fourth conduit 11, which contracts the expandable chamber 101 against the force exerted by the internal spring means 104 and pushes the valve stem 103 with the valve plate 102 for closing against the valve seat 22 in the discharge valve 2.

At the same time vacuum is connected further to the discharge valve 2 through the fifth conduit 14 for opening the discharge valve 2, whereby sewage collected in the sewage receptacle 1 (FIG. 1) is discharged (direction of sewage flow indicated by arrow) as the discharge valve 2 is opened.

After a given time, the control mechanism 5 closes the vacuum connection by switching the three-way valve position and re-establishes the contact between the aeration valve 51 in the control mechanism 5 and the fourth conduit 11 connected to the aeration means 10, whereby air flows into the aeration means 10 expanding the expandable chamber 101, biased by the internal spring means 104. As a consequence the valve stem 103 with the valve plate 102 is withdrawn from the valve seat 22 in the discharge valve 2, whereby the discharge valve 2 receives air (indicated by a double-ended arrow) directly through the second openings 15 (aeration mode C) and the open valve seat 22 rapidly closing the discharge valve 2. The discharge valve 2 is also aerated by way of the fifth conduit 14 through the aeration means 10, the fourth conduit 11 and the aeration valve 51 in the control mechanism 5.

The aeration means 10 according to the invention thus provides a rapid closure of the discharge valve 2 with the advantages discussed above. The aeration means 10, e.g. the rapid vent valve may be arranged either separated from or attached to the discharge valve 2 in this embodiment.

The vacuum sewer system is then ready for a new discharge or flushing sequence.

Figure 5:
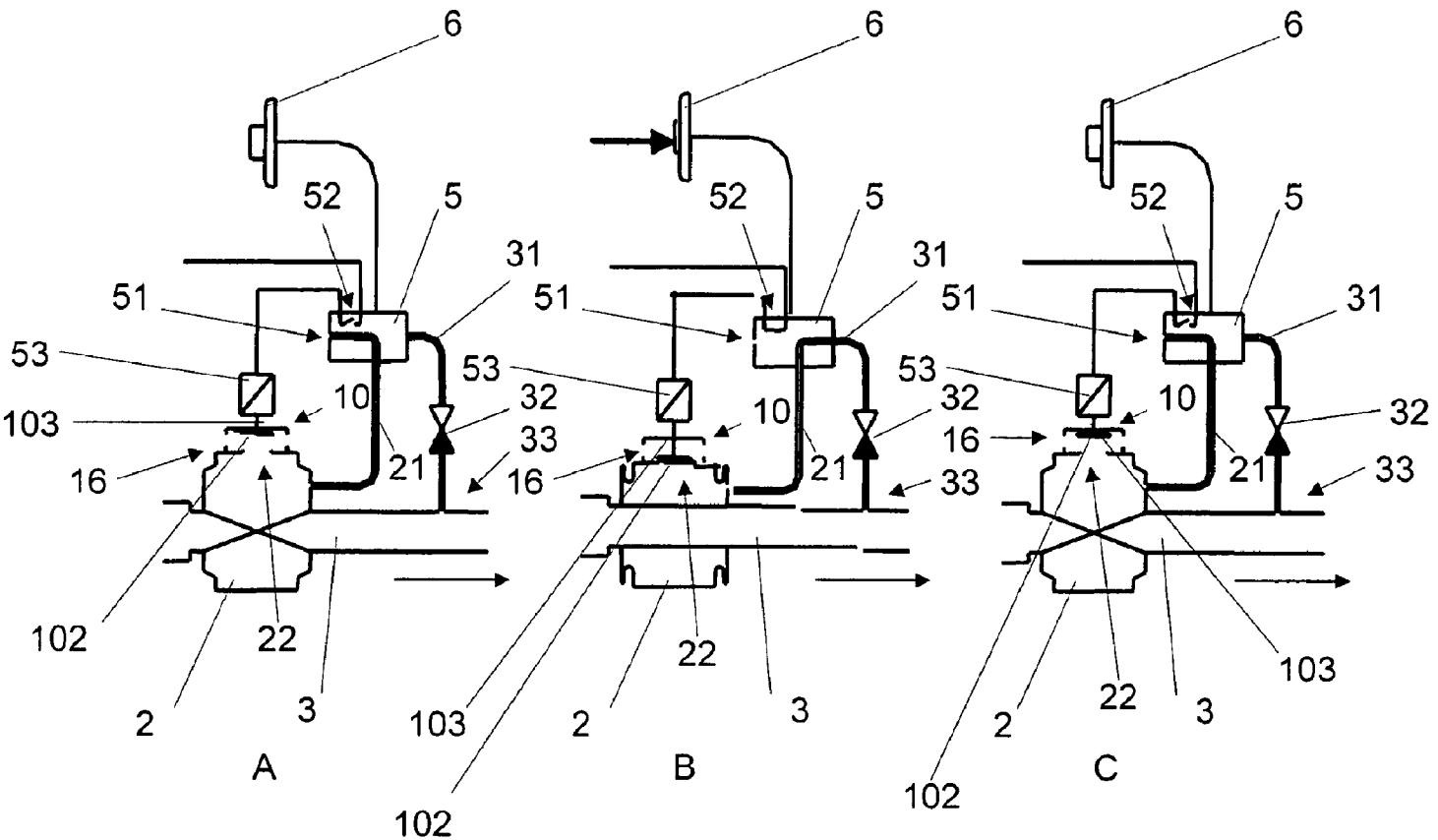
FIG. 5 illustrates a third embodiment of a discharge or flushing sequence deploying the present invention.

FIG. 5 shows a third embodiment of the present invention in which the function of the aeration means 10 is electrically governed.

The function of the vacuum sewer system is based on vacuum present in the sewer piping 3. The control mechanism 5 directs or supplies vacuum to the discharge valve 2 for opening the same. The control mechanism 5 generally functions like a three-way valve.

In this embodiment the vacuum sewer system comprises an aeration means 10, which is directly attached to the discharge valve 2. The aeration means 10 is in the form of a vent valve, or rapid vent valve and its purpose is to rapidly ventilate, i.e. provide air directly to the vacuum operated discharge valve 2 for the closing of the same. The control mechanism 5 comprises a sensor device 52 in connection with an aeration valve 51. The sensor device 52 reads the state of the aeration valve 51 and controls a magnetic valve 53, which in turn controls the aeration means 10. The aeration means 10 comprises a valve stem 103 with a valve plate 102 arranged to open or close against a valve seat 22 in the discharge valve 2.

In a stand-by mode (A) vacuum is connected to the control mechanism 5. Vacuum is tapped at point 33, adjacent and downstream of the discharge valve 2, of the sewer piping 3 and led through the check valve 32 and the first conduit 31 to the control mechanism 5. The discharge valve 2 is aerated through third openings 16 and the by way of the second conduit 21 through the aeration valve 51 in the control mechanism 5. The sensor device 52 reads the state of the aeration valve 51, aired and connected to the aerated discharge valve 2 through the second conduit 21, and keeps the magnetic valve 53 in an idle state and the valve stem 103 with the valve plate 102 in a withdrawn position, away from the valve seat 22 in the discharge valve 2 providing for an inflow of air through the third openings 16 discussed above.

For the discharge or flushing sequence (B), the control mechanism 5 is activated (indicated by a black arrow) by the activating means 6. This switches the three-way valve position and establishes a contact between the second conduit 21 and the vacuum available in the control mechanism 5 through the first conduit 31, whereby a vacuum connection to the discharge valve 2 is switched on. Simultaneously the sensor device 52 reads the state of the aeration valve 51, closed of from the connection with the second conduit 21, and switches on electric current to the magnetic valve 53, which activates the valve stem 103 with the valve plate 102 and closes the valve plate 102 against the valve seat 22 in the discharge valve 2. Vacuum is thus directed to the discharge valve 2 for opening the same, whereby sewage collected in the sewage receptacle 1 (FIG. 1) is discharged (direction of sewage flow indicated by arrow) as the discharge valve 2 is opened.

After a given time, the control mechanism 5 switches off the vacuum connection to the discharge valve 2 by switching the three-way valve position and re-establishes contact between the aeration valve 51 in the control mechanism 5 and the discharge valve 2 through the second conduit 21. At the same time the sensor device 52, reading the changed state of the aeration valve 51, i.e. reading that the vacuum connection through the control mechanism 5 to the discharge valve 2 is switched off, switches off the electric current to the magnetic valve 53, whereby the valve stem 103 with the valve plate 102 are withdrawn from the valve seat 22 in the discharge valve 2. As a consequence, the discharge valve 5 receives air (indicated by a double-ended arrow) directly through the third openings 16 and the open valve seat 22 and is rapidly closed (aeration mode C). Air is also provided by way of the second conduit 21 through the aeration valve 51 in the control mechanism 5.

The aeration means 10 according to the invention provides a rapid closure of the discharge valve 2 with the advantages discussed above.

The vacuum sewer system is then ready for a new discharge or flushing sequence.

The drawings and the description related thereto are only intended for clarification of the basic idea of the invention. The invention may vary in detail, e.g. vacuum for the control means and for governing the discharge valve may be taken from another location of the sewer piping or another source than described above, different pneumatic or electrical connections from the control mechanism to the aeration means may be used, within the scope of the ensuing claims.

The invention claimed is:

1. A vacuum sewer system comprising a sewage receptacle, sewer piping connected to the sewage receptacle by means of a discharge valve provided with an aeration means, a vacuum generating means for generating vacuum in the sewer piping, and a control mechanism for controlling the discharge valve and the aeration means, wherein (a) the control mechanism is configured to be activated in order to provide a primary vacuum connection between the vacuum generating means and the discharge valve in order to open the discharge valve and discharge the sewage receptacle while the aeration means remains closed, and (b) wherein the aeration means comprises a valve plate configured to open or close against a valve seat in the discharge valve, the aeration means [configured to provide] *governed by* an auxiliary vacuum that is activated after the control mechanism closes the primary vacuum connection, such that the valve plate is configured to be (i) withdrawn from the valve seat so that air is supplied directly to the discharge valve through the open valve seat for closing the discharge valve after a discharge or flushing sequence, and (ii) closed against the valve seat when the discharge valve is provided with the primary vacuum connection for opening the discharge valve for the discharge or flushing sequence.

2. The vacuum sewer system according to claim 1, wherein the function of the aeration means is pneumatically governed.

3. The vacuum sewer system according to claim 1, wherein the function of the aeration means is electrically governed.

4. The vacuum sewer system according to claim 1, wherein the aeration means comprises a vent valve, which is attached to the discharge valve and connected to the control mechanism by means of a fourth conduit, and in that the aeration means is provided with an aeration nozzle.

5. The vacuum sewer system according to claim 4, wherein the aeration means is arranged to be opened by vacuum provided from the discharge valve by way of a second conduit through the control mechanism and further through the fourth conduit to the aeration means in order to provide air to the discharge valve for closing the discharge valve after the discharge or flushing sequence, and in that the aeration means is arranged to be closed with a given delay after said discharge or flushing sequence by air provided through the aeration nozzle.

6. The vacuum sewer system according to claim 1, wherein the aeration means comprises a vent valve, which is arranged in connection with the discharge valve and connected to the control mechanism by means of a fourth conduit, and in that a fifth conduit is provided between the aeration means and the discharge valve.

7. The vacuum sewer system according to claim 6, wherein the aeration means is arranged to be opened by air provided by way of the fourth conduit through an aeration valve in the control mechanism in order to provide air to the discharge valve for closing the discharge valve after the discharge or flushing sequence, and wherein the aeration means is arranged to be closed by vacuum available in the control mechanism and provided by way of the fourth conduit.

8. The vacuum sewer system according to claim 3, wherein the aeration means comprises a vent valve, which is attached to the discharge valve, and wherein the control mechanism is arranged to control the aeration means by way of a sensor device and a magnetic valve connected to the aeration means.

9. The vacuum sewer system according to claim 8, wherein the aeration means is arranged to be opened by the magnetic valve when the sensor device reads that the vacuum connection to the discharge valve through the control mechanism is switched off in order to provide air to the discharge valve for closing the discharge valve after the discharge or flushing sequence, and wherein the aeration means is arranged to be closed when the sensor device reads that the vacuum connection to the discharge valve through the control mechanism is switched on.

10. A discharge valve for a vacuum sewer system comprising a sewage receptacle, sewer piping and a vacuum generating means for generating vacuum in the sewer piping, whereby the discharge valve is (a) provided with an aeration means, (b) arranged between the sewage receptacle and the sewer piping, and (c) controlled by a control mechanism, wherein the control mechanism is configured to be activated in order to provide a primary vacuum connection between the vacuum generating means and the discharge valve in order to open the discharge valve and discharge the sewage receptacle while the aeration means remains closed, wherein the aeration means is controlled by the control mechanism and comprises a valve plate arranged to open or close against a valve seat in the discharge valve and the valve plate is arranged to be withdrawn from the valve seat so that air is supplied directly to the discharge valve through the open valve seat for closing the discharge valve after a discharge or flushing sequence and arranged to be closed against the valve seat when the discharge valve is provided with vacuum for opening the discharge valve for the discharge or flushing sequence, wherein the aeration means [configured to provide] *is governed by* an auxiliary vacuum that is activated after the control mechanism closes the primary vacuum connection.

11. The discharge valve according to claim 10, wherein the function of the aeration means is pneumatically governed.

12. The discharge valve according to claim 10, wherein the function of the aeration means is electrically governed.

13. The discharge valve according to claim 10, wherein the aeration means comprises a vent valve, which is attached to the discharge valve and connected to the control mechanism by means of a fourth conduit, and in that the aeration means is provided with an aeration nozzle.

14. The discharge valve according to claim 13, wherein the aeration means is arranged to be opened by vacuum provided from the discharge valve by way of a second conduit through the control mechanism and further through the fourth conduit to the aeration means in order to provide air to the discharge valve for closing the discharge valve after the discharge or flushing sequence, and in that the aeration means is arranged to be closed with a given delay after said discharge or flushing sequence by air provided through the aeration nozzle.

15. The discharge valve according to claim 10, wherein the aeration means comprises a vent valve, which is arranged in connection with the discharge valve and connected to the control mechanism by means of a fourth conduit, and in that a fifth conduit is provided between the aeration means and the discharge valve.

16. The discharge valve according to claim 15, wherein the aeration means is arranged to be opened by air provided by way of the fourth conduit through an aeration valve in the control mechanism in order to provide air to the discharge valve for closing the discharge valve after the discharge or flushing sequence, and in that the aeration means is arranged to be closed by vacuum available in the control mechanism and provided by way of the fourth conduit.

17. The discharge valve according to claim 12, wherein the aeration means comprises a vent valve, which is attached to the discharge valve, and in that the control mechanism is arranged to control the aeration means by way of a sensor device and a magnetic valve connected to the aeration means.

18. The discharge valve according to claim 17, wherein the aeration means is arranged to be opened by the magnetic valve when the sensor device reads that the vacuum connection to the discharge valve through the control mechanism is switched off in order to provide air to the discharge valve for closing the discharge valve after the discharge or flushing sequence, and in that the aeration means is arranged to be closed when the sensor device reads that the vacuum connection to the discharge valve through the control mechanism is switched on.

* * * * *